Oct. 21, 1969  A. A. HIRSCH  3,474,003
COMBINATION SAMPLE-CULTURE BOTTLE FOR BACTERIOLOGICAL TESTS
Filed Dec. 8, 1965
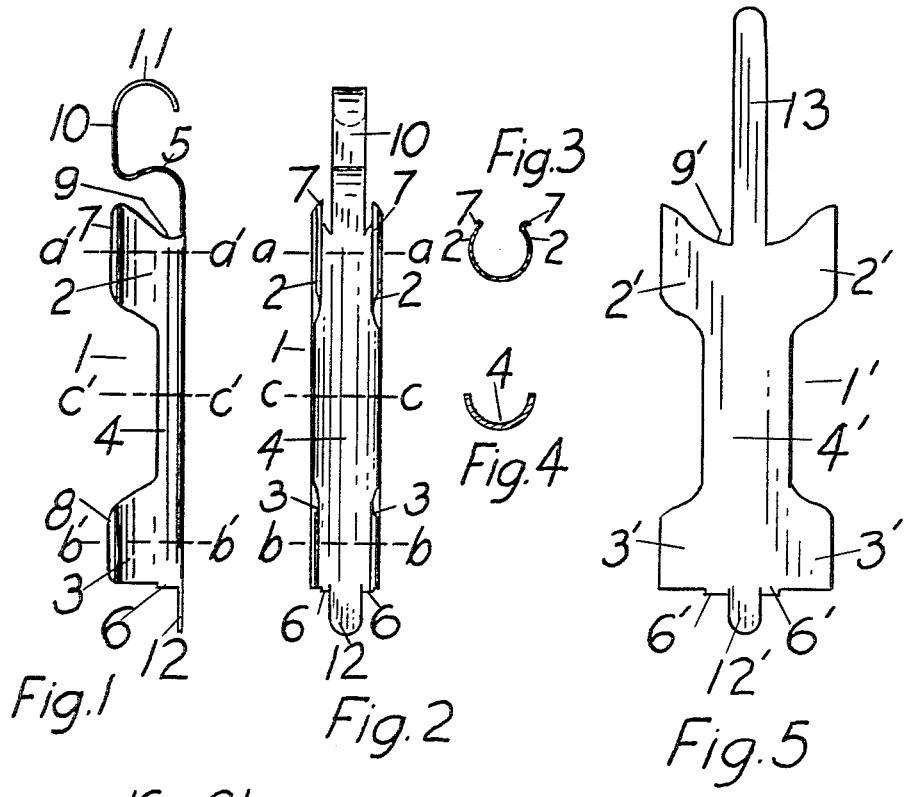
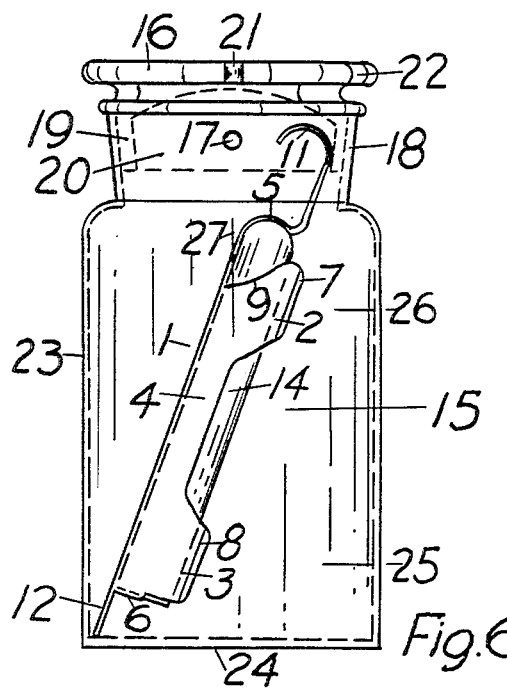
A. Adler Hirsch
INVENTOR.

United States Patent Office 3,474,003
Patented Oct. 21, 1969

3,474,003
COMBINATION SAMPLE-CULTURE BOTTLE FOR BACTERIOLOGICAL TESTS
Abraham Adler Hirsch, 141 Norwood St., Shreveport, La. 71105
Filed Dec. 8, 1965, Ser. No. 513,667
Int. Cl. C12k *1/04, 1/10;* B01l *3/00*
U.S. Cl. 195—127
3 Claims

ABSTRACT OF THE DISCLOSURE

A Dunham inverted vial is clasped within a readily removable cage resting within a sample bottle which contains autoclaved nutrient solution. By proper manipulation the testing operation, particularly for potable waters, is reduced to the mere act of sampling followed by direct incubation.

---

This invention relates to an improved and simplified means for testing potable water supplies for the presence of coliform bacteria. The device described herein more broadly may be used for testing any liquid or liquifiable material for bacteria capable of decomposing the culture medium with the formation of gas as one of the end products.

Bacterial safety of drinking water supplies is based primarily on the virtual absence of organisms indicative of sewage pollution. Of the various bacteria indigenous to the intestines of warm blooded animals the *Bacillus coli* and its associated types, known collectively as coliform bacteria, is the group most widely employed as the test organisms. Demonstration of their presence is relatively simple, since this is one of the comparatively few bacterial groups which can ferment lactose with the production of gas. All that is necessary for a test is to inoculate a sterile lactose or equivalent broth with a sample in question; if coliform bacteria are present gas will collect in an inverted vial previously placed in the culture vessel. The larger the volume of sample examined, the more assurance of safety of a water supply when the test is negative. With the vast majority of domestic water supplies, the test is consistently negative; any variation is cause for immediate investigation for the reason.

The test procedure heretofore used consists in collecting a sample in a sterile container, dechlorinating the sample usually with a couple of crystals of sodium thiosulfate at the bottom of the container whenever appreciable time is expected to elapse between sampling and culturing, transporting the sample to a laboratory, inoculating by pipetting out various volumes of sample to culture tubes, and incubating. The culture tubes are examined in 24 and 48 hours for a show of gas in the inverted fermentation vials.

An object of my invention is to combine the steps of sampling and inoculating into a single operation, so as to simplify the test, save time of a technician, and reduce manipulation to a minimum. Furthermore, by such simplification many individuals other than experienced technicians are able to perform the test, hence many situations which escape testing may be readily investigated. Thus adoption of this device would promote public health safety so far as drinking water supplies are concerned.

Another object of my invention is to permit bacterial acclimatization and growth to start immediately following sampling. Ordinarily a sample must await delivery to a laboratory before being implanted. With this device the sample is inoculated into the broth concurrently with the act of drawing. Hence there is avoided the usual delay in culturing, and the early stages of growth can proceed immediately.

Another object is to allow culture of large volumes of samples in order to obtain better assurance of safety. Laboratory cultures are restricted to sizes of commonly used test tubes, flasks and similar containers. With the method to be described there is no upper limit, beyond economics, to the size of the container, although a conventional size of sample bottle is sufficient for practically all cases.

Another object is to provide a vessel in which the culture medium may be previously sterilized in the form of a broth. Dry sterilization of dehydrated media is generally regarded as decidedly inferior practice. Since vapor pressure is built up during autoclaving, the device must allow for opening and closure to relative the partial vacuum formed during subsequent cooling. Otherwise the stopper would freeze shut, and the bottle could be opened only by overheating or breaking, neither of which are workable alternatives.

Further objects of the invention are to reduce the amount of glassware required for water bacteriology, to obviate the necessity for seeding a sample bottle with dechlorinating agents, and to permit quick scanning of fermentation tests.

This apparatus is a revision of applicant's Patent No. 2,476,093 in which a plurality of glass vessels of different sizes, each with separate fermentation vials, were sealed within the sample bottle. In order to manufacture such an apparatus considerable piece work was required by a skilled glass blower. This feature and the possibility of breakage by thermal strains made the earlier device impractical for widespread adoption. The present application avoids all glass blowing operations by employing only a single fermentation vial which is removably retained within a properly fitting metal cage.

Another object is to provide physical protection for the fermentation vial within the sample bottle, and its approximate fixation in position so that the bottle may be manipulated in requisite manner during and immediately subsequent to sampling. This protection allows for removal of the vial for cleaning. Furthermore, this protection is devised to avoid interference with observation along the whole length of the vial later for production of gas.

These various objectives as hereinbefore stated are attained in subject apparatus by caging an inverted vial within a ground glass stoppered sampling bottle. The cage, resting on the bottom and extending into the hollow of the ground glass stopper restrains the vial from excess motion during manipulations. In order to be immediately available for inoculation media in solution is sterilized in the bottom of the bottle. A hole through the neck of the bottle, registering with a like hole in the stopper, is left open during sterilization to allow release of pressure and later vacuum. These holes remain open until the bottle is thoroughly cooled to ambient temperature following autoclaving so as to avoid seizure in the ground glass joint. When cool the stopper wrapped in heavy paper or tin foil down to below the mouth of the bottle prior to sterilization, is rotated to separate the vent holes and thus close the bottle.

Sampling is performed merely by dislodging the broth, risen during autoclaving into the vial, introducing the sample of water, mixing, and finally inverting the bottle, holes being out of register, to refill the fermentation vial, this time with inoculum and media mixture. The sample is now ready for incubation. Since aerobic conditions are desired in water bacteriology the stopper is again rotated to a slight approximation at the holes. Examination of the incubated sample for production of gas follows after the customarily observed incubation period.

Details of this combination sample-culture bottle are shown in the drawings in which:

FIGURE 1 is a side elevation of the supporting cage or crutch for retaining the inverted vial;

FIGURE 2 is a front elevation of the same;

FIGURE 3 shows a horizontal section cut across axis *a, a* of FIGURE 2;

FIGURE 4 shows a horizontal section along line *c, c* of FIGURE 2;

FIGURE 5 is a stretchout pattern to show configuration of the cage before rolling to shape, and thus aid in visualization of the previous views; and FIGURE 6 is an elevation showing the assembled apparatus with an inverted vial, retained within the cage which is restrained from excess motion within a ground glass stoppered sampling bottle having a perforated neck and hollow type stopper.

Referring to the various views for discussion of detailed features and construction:

FIGURE 1 shows a cage 1 made from thin, flexible, spring temper, non-corrosive and non-toxic metal sheet. Stainless steel shim stock, 8 mil thickness, serves for this purpose satisfactorily. A pair of upper jaws or clamps 2, 2 and a lower set 3, 3 are over-rolled so as to permit elastic and positive grip of a vial. Most of the cage is an open, semi-cylindrical shell section 4 into which an inverted vial can be socketed. A curved top strip or cap band 5 and a pair of bottom stops 6 prevent endwise motion of the vial within the cage. Two pair of lips 7, 7 and 8, 8 on the top and bottom clamps, respectively, allow for the vial to be clipped positively within the cylinder-like enclosure. The top and bottom jaws are not continuous for the length of the cage in order to permit unimpeded inspection of the middle portion of the tube or vial for gasification. The jaws themselves form only a partial closure around the vial that will be inserted, so that gas bubbles at this height may be observed. Above the top jaw is a cut out 9 to allow access of light and complete visibility to the very top of the vial.

Above the cap curve 5 is a straight portion 10 along the upper strip, terminating in a top curve 11. A bottom supporting strip 12 holds the vial above the bottom of the sample bottle. The whole cage enclosure prevents glass to glass contact between a vial and sample bottle thus protecting against breakage.

The frontal view FIGURE 2 of the cage shows the same parts as disclosed in FIGURE 1. Top strip 10 and bottom support 12 appear as flat straps.

FIGURE 3, the section along line *a, a* of FIGURE 2, shows the incomplete cylindrical shell at the upper jaw or clasp 2 and its termination in outspread lips 7. These permit insertion of a vial by spreading the clamp when pressed apart. FIGURE 3 may also be regarded as a section along line *a', a'* of FIGURE 1, which cuts the upper clamp section there, provided it is rotated 90°.

Likewise, FIGURE 3 shows the cross section along line *b, b* cutting the bottom clasp 8 of FIGURE 2. Similarly it shows section *b', b'* of FIGURE 1, provided this is rotated 90°.

FIGURE 4 is a cross section along axis *c, c* cutting the semi-cylindrical channel along the middle segment of FIGURE 2. As before, this view also represents the section made by cutting FIGURE 1 along axis *c', c'*, provided the severed surface is rotated 90°.

In FIGURE 5, the stretchout template, the various parts are numbered by primes to correspond to their counterpart shapes after rolling to form the cage of FIGURES 1 and 2. Top strip 13, after shaping, becomes segments 5, 10 and 11 of FIGURE 1.

FIGURE 6 shows an assembly in which cage 1 is used to retain an inverted vial 13 within a bacterial sample bottle 15. A mushroom type ground glass stopper 16 fits in the top of bottle 15. A hole 17 is drilled through the neck 18 of the bottle and the skirt 19 of the hollow or dome 20 of the stopper. A V-notch 21 is ground into the rim 22 of the stopper in vertical alignment with the hole to facilitate matching. Upper curve 11 of the top strap fits to one side within the hollow of the stopper. Curve 11 allows the cage and bottle to deflect out of the way laterally when stopper 16 is pressed home. Bottom support 12 rests in the corner formed between the sides 23 of the bottle and its bottom 24. Due to the distribution of weight below a line connecting the points of support the caged vial is in stable equilibrium. The bottle may be shaken or inverted without danger of dislodging or breaking the vial.

The vial 14 is clasped between upper jaws 2 and lower jaws 3. It had been inserted in the cage by pressing it through upper lips 7 and lower guide lips 8. It is prevented from slipping out at the bottom by stops 6. Upper curved cut out 9 permits an unobstructed view of the top of vial 14 to observe small bubbles of gas from any angle. The remainder of the tube can be observed either side wise or frontally across the channel section 4. Within the clasps observation of the vial is possible by viewing frontally, as evident from FIGURES 2 and 3.

Marks 25 and 26 are scribed on bottle 15 corresponding to levels for the sterile liquid media and the combined volumes of media plus sample, respectively. An index 27 is scratched slightly below the shoulder of the bottle to align the hole 17 through the neck of the bottle and the stopper.

The vial is placed within the cage by pressing it through lips 7 and 8 into clasps 2 and 3, respectively. It is removed therefrom by inserting a pencil up the bore lifting out, thereby using the upper portion as a fulcrum. Ordinarily a vial may be cleaned without removal from the cage.

The method of using this device is now explained. Assume, for example, that 100 ml. of potable or other high quality water sample is to be tested. Place the proper amount of culture media, in this case 4.3 gm. of Lauryl Tryptose Broth, dehydrated, or its equivalent, in the bottom of the sample bottle. Add 20 ml. of water to effect solution. Have the holes in the neck of the bottle and the stopper register to allow escape of air and later partial vacuum when cooling. Cover the stopper and neck of the bottle with kraft paper or metal foil to prevent later contamination on handling. Sterilize at 15 p.s.i. for 15 minutes. Allow the pressure to return to atmospheric and remove the bottle from the autoclave. Let the bottle stand until thoroughly cool, then, keeping the paper or foil cover in place, twist the stopper slightly to unmatch the holes, thereby closing the bottle. It is now ready for storage or sampling.

Before drawing a sample from a faucet or similar fixture the media which had been forced up to the top of the inverted vial if first drained therefrom by inverting the bottle and setting it on the side opposite the open bottom of the vial, then returning the bottle upright. The stopper is next removed and 100 ml. of water sample collected, making entry gently as possible. The stopper is inserted with the holes apart and the sample and media mixed by swirling the bottle. Completion of mixing is judged from uniformity of color. Vertical agitation is generally undesirable as this forms durable foam.

The bottle is next inverted to fill the vial, thereby completing manipulations. The assembly is ready for incubation and later observation for gasification after 24 hours et seq. Just before incubating the holes are brought into incipient alignment to insure aerobic conditions. This is done by feel through the paper cover, using the V-notch on the rim of the stopper, almost matching it with the index 27 on the bottle.

If the test is negative for gas the contents of the bottle are discarded; if positive, a loopful of the culture is implanted according to well known procedure to a supplementary confirmatory broth.

When cleaning the bottle and vial the whole may be rinsed together, or the caged vial removed for separate washing. Usually it is unnecessary to separate the vial from the cage.

A combination sample-culture bottle containing a relatively large sample of potable water may be used singly when freedom from coliform bacteria is known from past experience; or in replicate, say 5 such implatations, when an attempt is made to establish a most probable number from well known statistically derived tables.

I claim:

1. A bacteriological combination sample-culture bottle device for performing tests for coliform bacteria and other fermentations that produce a gaseous end product comprising a sample-culture bottle, a stopper therefor fitting into the neck thereof and a freely-fitting, diagonally resting removable cage loosely retained therein and holding an inverted vial, said cage being formed of a single piece of material and having an opening along its entire length and extending from the bottom of the bottle to the stopper to permit unhampered inspection of said inverted vial.

2. The device of claim 1 in which said cage is provided with a bottom support strip to set the open end of said inverted vial a sufficient distance above the bottom of said bottle so as to prevent contact between said vial and said bottle and retention means to prevent edgewise motion of said vial within said cage.

3. The combination recited in claim 1 in which said cage consists essentially of a semi-cylindrical shell except at the ends thereof, both top end and bottom end being overolled into an elastic clasp section, the tips of said clasps being flared outwardly to form a lip for entry of a vial, a cut-out at the top of said top clasp to permit observation to the top of said vial, a flat retention spring beyond the top of said clasp curved to receive and socket the rounded end of said vial, a straight extension section above said curved portion to furnish proper length for restrained retention in said sample bottle, a curved top portion above said straight section to fit into the dome of a hollow type ground glass stopper and deflect out of the way when the stopper is seated to close said bottle, a flat bottom support strip to set the open end of said inverted vial a sufficient distance above the bottom of said bottle so as to prevent contact between said vial and said bottle, and a pair of stops at the bottom of said bottom clasp which, with elastic retention by said top spring strip, prevent said vial from sliding lengthwise in said cage.

References Cited

UNITED STATES PATENTS

| | | | |
|---|---|---|---|
| 2,476,093 | 7/1949 | Hirsch | 195—140 |
| 2,873,850 | 2/1959 | Ortegren | 23—292 |
| 3,058,813 | 10/1962 | Barney et al. | 23—292 |
| 3,239,429 | 3/1966 | Menolasino et al. | |

OTHER REFERENCES

Hirsch: Journal of the American Water Works Association, vol. 36, No. 12, December 1944, pages 1365 to 1370.

ALVIN E. TANENHOLTZ, Primary Examiner

U.S. Cl. X.R.

23—292; 195—103.5, 139